United States Patent [19]

Chan

[11] Patent Number: 5,466,058
[45] Date of Patent: Nov. 14, 1995

[54] STACKABLE INTERLOCKING MODULAR STORAGE SYSTEM

[75] Inventor: Shiu C. Chan, Agoura Hills, Calif.

[73] Assignee: One Two One Systems, Inc., Agoura Hills, Calif.

[21] Appl. No.: 291,127

[22] Filed: Aug. 15, 1994

[51] Int. Cl.⁶ .................................................. F16B 12/00
[52] U.S. Cl. ...................... 312/111; 312/263; 312/107; 312/109
[58] Field of Search .................................. 312/107, 108, 312/109, 111, 263, 265.5, 329

[56] References Cited

U.S. PATENT DOCUMENTS

| | | | |
|---|---|---|---|
| 3,822,924 | 7/1974 | Lust | 312/111 |
| 4,053,192 | 10/1977 | Spetner | 312/107 |
| 4,171,150 | 10/1979 | Soderlund | 312/107 |
| 4,319,795 | 3/1982 | Klaus | 312/111 X |
| 4,378,137 | 3/1983 | Gibson et al. | 312/108 |
| 4,418,967 | 12/1983 | Winkelman, Jr. et al. | 312/107 |
| 4,502,741 | 3/1985 | DeVries et al. | 312/108 |

FOREIGN PATENT DOCUMENTS

| | | | |
|---|---|---|---|
| 0815935 | 6/1969 | Canada | 312/263 |

Primary Examiner—Kenneth J. Dorner
Assistant Examiner—James O. Hansen
Attorney, Agent, or Firm—Koppel & Jacobs

[57] ABSTRACT

A modular storage system is formed from a plurality of stackable cube-shaped or rectangular-shaped units. Each unit is locked to another adjacent unit with fasteners inserted through their side walls. Each cube modular unit is formed by four identical rectangular panels which face each other in a box-like configuration without a lid or bottom, There are a plurality of tabs and notches in the beveled surface of the abutting edges of each panel. The beveled top edge of each panel mates with the beveled bottom edge to form a miter joint and to allow the complementary tabs and notches in the edges to lock together to prevent lateral displacement. There are a pair of grooves near each edge to allow for a curved molding to slide into to lock the edges of the panels together. The inside wall of each panel has a series of channels to allow shelves to be positioned in the body of the cube. A hanging door can be placed in the front of the cube to conceal the shelving. Drawer inserts can be placed in the interior along the channels to form a multi-drawer chest.

11 Claims, 6 Drawing Sheets

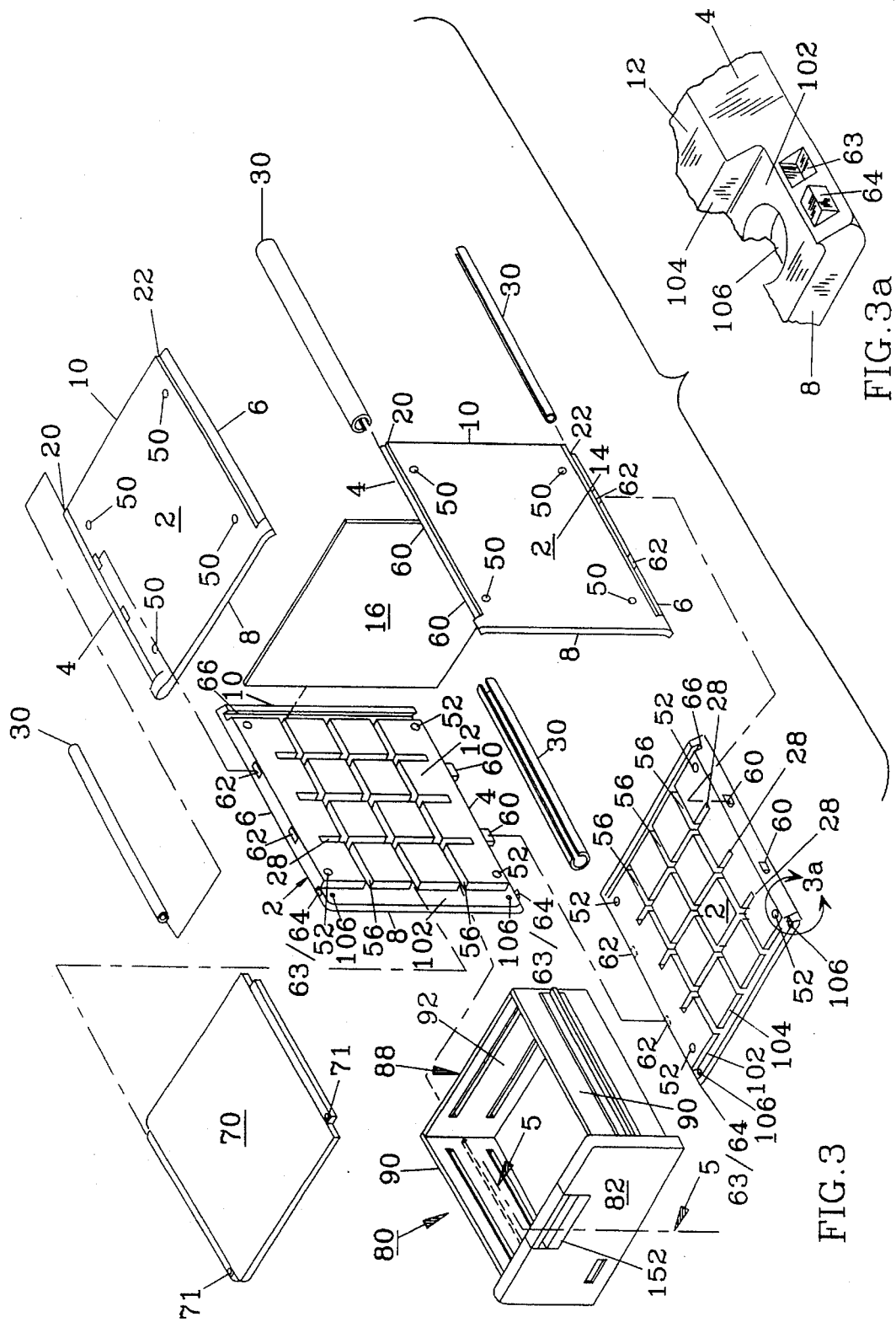

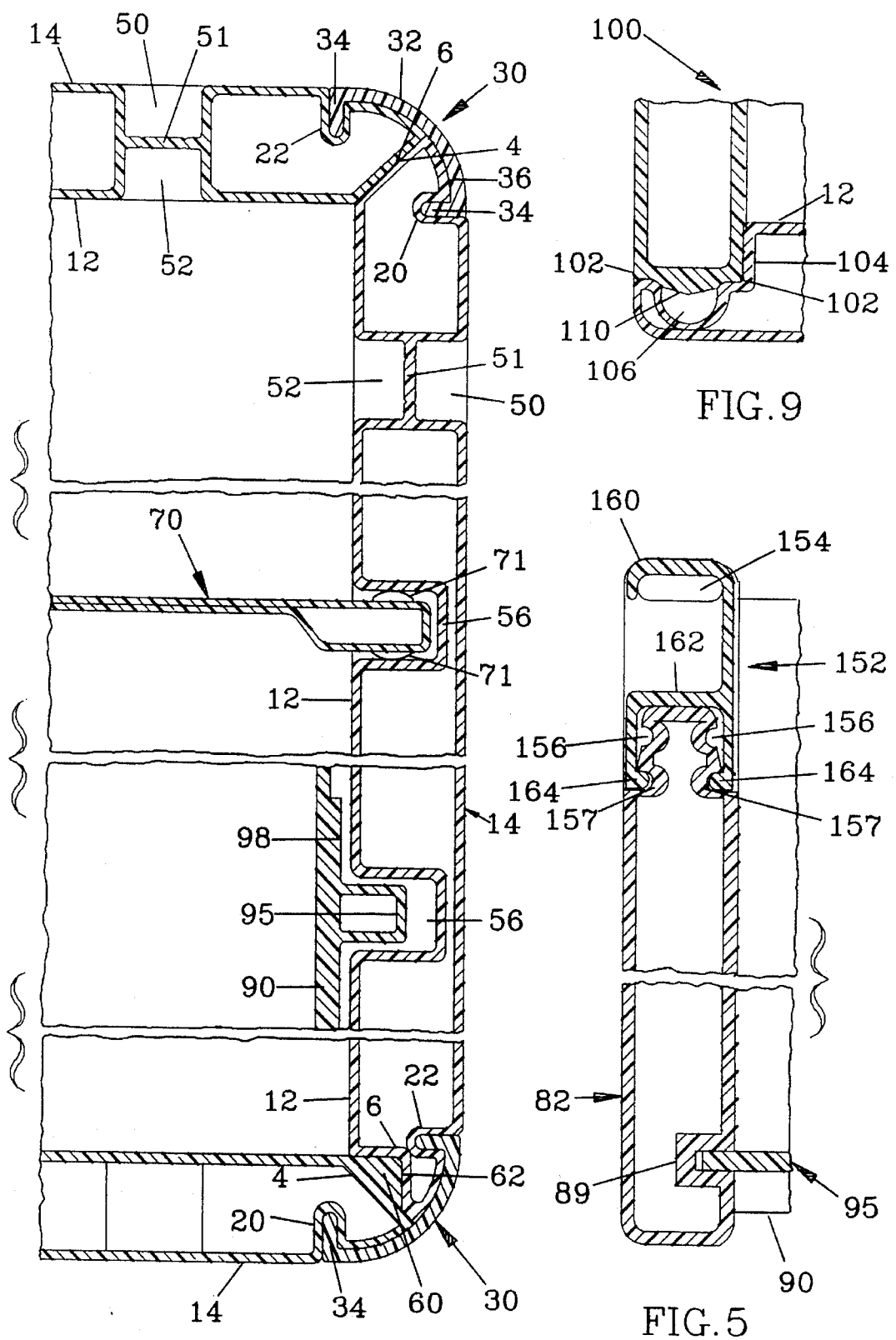

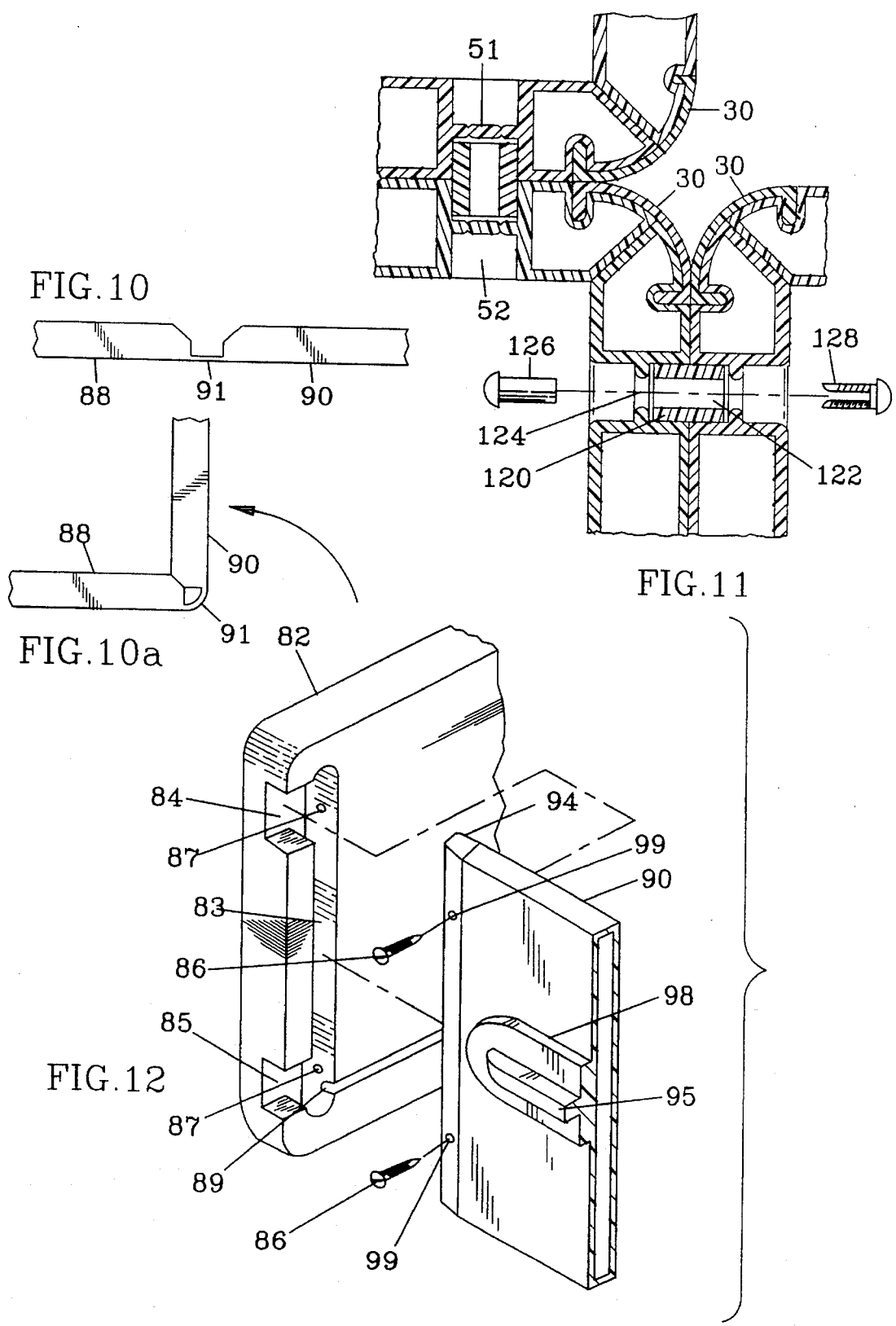

5,466,058

STACKABLE INTERLOCKING MODULAR STORAGE SYSTEM

BACKGROUND OF THE INVENTION

1. Field of the Invention

Supports, Cabinet structures—Arrangements of plural cabinets with interposed table; With movable components horizontally movable (e.g. drawer). Horizontally movable with latch, lock or gravity closer; Knockdown or setup type with adjacent walls rigidly interlocked, opposite walls rigidly interlocked and free standing in final configuration.

2. Description of the Prior Art

Modular furniture units are well known in the prior art. Modular storage units are also well known in the prior art. A typical modular system is comprised of stackable cube-shaped containers having the overall configuration of a square box. The front of each cube unit is open so that a series of shelves, drawer inserts, or a hinged door can be positioned at the front opening of the cube. In other configurations, the cube is an elongate rectangular-shaped unit having the same overall dimensions as two cubes would have if stacked one on top of each other, or placed side by side. In this configuration, the top and the bottom panels are square and rectangular in shape while the sides and the back panels are rectangular but not square in shape. The cubes can be stacked and arranged so that they will be placed one upon the other, or side by side, to form a storage or wall unit.

The modular cube units known in the prior art have right angle corners and are comprised of wood or particle board construction. The five panels which comprise a typical cube are fabricated at the factory and cannot be disassembled and rearranged in different configurations. The panels comprising a cube are fastened together along with the shelves, drawers and hinges so that there is no means to rearrange the individual panels and shelves to create a different collection of modular units. Additionally, the individual square cube or rectangular cube modular units, which are stacked together to form the entire system, usually do not have interlocking means for interlocking the various cubes to form an integrated rigid free standing storage or wall unit. They simply rest on top of one another by means of gravity and/or they are stacked side by side to form a complete unit. Quite frequently the prior art modular units are boxed and sold as unassembled parts along with instructions, screws, nails, glue, and hardware so that the purchaser can assemble the modular unit by himself. Even so, the fasteners and glue result in a permanent configuration and the individual panels cannot be separated and rearranged to form another type of configuration if so desired by the purchaser.

SUMMARY AND OPERATION OF THE INVENTION

The basic component of the present invention is a one-piece elongate rectangular or a generally square-shaped double wall plastic panel having an outer wall, an inner wall, a top edge, a bottom edge, a rear edge, and a front edge. The two panels in combination or by themselves are the basic building blocks for the entire system. The top and bottom edges of each panel having a flat sloping surface. Each is beveled at a 45 degree angle in cross section. The top and bottom 45 degree beveled surfaces at the top and bottom edges allow for adjacent touching panels to be configured at right angles relative to each other to form a hollow regular parallelepiped. The touching beveled surfaces of two adjoining panels form a miter joint in cross section. The top and bottom edges of each panel have a rounded or radiused curved surface at the transition between the outer edge of the beveled surface and the flat outer wall. Each radiused curved surface at the top and bottom edges forms a 45 degree arc in cross section, or an eighth of a circle. The pair of mating radiused curved surfaces of opposed panels combine to form a 90 degree arc, or a quarter circle in cross section.

There are a pair of spaced apart tabs extending from the beveled surface of the top edge, and there are a pair of notches indented in the beveled surface of the bottom edge of each panel. Both tabs and notches are spaced the same on both edges so that the tabs on the top edge of one panel will match up with and mate with the notches on the bottom edge of an adjacent touching panel. There are also a pair of small complementary side-by-side notch-and-tabs formed at the front of both beveled edges near the front edge. Other than the tabs and notches, either panel is symmetrical relative to a cross-sectional vertical plane positioned midway between and parallel to the top and both edges. When the adjacent edges of two opposed panels touch, the complementary pairs of small notch-and-tabs mesh to prevent the two panels from slipping back and forth relative to each other. The large pairs of tabs and notches on the beveled edges also assist in preventing transverse slippage between the two touching panels.

An elongate longitudinal top retaining groove extends into the outer surface of the wall of the panel and is positioned inboard from and parallel to the top edge. There is an identical elongate bottom retaining groove also formed in the outer wall of the panel and positioned inboard from and parallel to the bottom edge of the panel. Both grooves are positioned the same distance from their respective outer beveled edges. The pair of retaining grooves adjacent to the top and bottom edges of the panel are provided so that an interlocking molding can be slid along both grooves which are positioned lengthwise and in parallel relationship with the mitered joint formed in cross section by the two adjoining top and bottom edges of adjacent touching panels. The slits for both retaining grooves are positioned radially along the imaginary 90 degree angle lines emanating from the circular center corresponding to the arc formed by the radius curve on the rounded edge adjacent to the beveled edge. Both retaining grooves extend from the back edge of the panel and terminate before they meet the front edge of the panel.

The interlocking molding has a pair of lengthwise opposed radial runners extending lengthwise along both edges of the spline so that the runners can slide into the retaining grooves and corresponding radial slits formed in the interlocking panels. The body of the molding has a quarter circle radius in cross section, and a concave curved inner surface and a complementary outer convex curved surface which will mimic and overlay the two eighth circle radiused curved surfaces of the abutting edges of two panels positioned at a right angle to each other.

The radiused curved areas between both retaining grooves at the top and bottom areas of the panel are recessed slightly. After the spline has been slid into place, the outer convex surface of the spline lies flush with the outer surfaces of both outer walls of the adjacent touching panels to form a smooth uninterrupted rounded edge at each of the touching four corners of the cube. Both retaining grooves terminate before they reach the front edge of the panel. The molding is shorter than the length of the top edge or the bottom edge.

The front transverse edge of the basic interlocking panel unit has a flat transverse ledge and a riser portion located between the ledge and the platform forming the inner wall. The ledge and riser portion are parallel to and inboard from the front edge. The ledge runs the entire width of the front edge of the panel. Additionally, there are two circular dome-shaped recesses or sockets formed in the surface the ledge; one placed near the top edge of the panel, and the other one near the bottom edge of the panel. The riser portion adjacent the front ledge faces outwardly towards the user and forms a rectangular flat facing border around the inner rim of the front open end area of the cube. The border abuts against the drawer or door to limit their entry into the interior of the cube. The two recesses in the ledge are used when a hanging door is placed at the front opening of the cube unit. The typical hanging door will have the same rectangular shape but with slightly smaller dimensions than the front opening of the cube. It should have the same dimensions as the border formed by the riser portions. Both the top and bottom edges of the hanging pivotable door have a pair of circular knobs and catch projections at opposite ends on each edge.

When the four plastic panel units and accessories are in the process of being assembled to form the cube or rectangle module, the hanging door is initially positioned in the front by having the top and bottom knobs on the top and bottom of the door positioned in the circular recesses in the ledges in the opposite facing top and bottom panels, thereby providing a pivotable ball-and-socket joint at each knob-recess connection. The opposite pair of opposed circular recesses in the facing top and bottom panels each acts as a detent to lock the catch projection on the top and bottom edge of the door. The door is locked by means of the catch projections and recessses when the door is closed on the cube or rectangle module. A simple pull on the door's handle will unlock it, however. The door is symmetrical transversely and therefore can be mounted either left or right. The pairs of knobs and catches on the top and bottom of the door, and the pair of recesses formed in the ledge of the panel are designed so that the door can be mounted universally as a left or right opening door. This eliminates the need to have two separate types of doors for the basic cube or rectangle system. Of course, an extended door is required in the rectangle or large cube unit. When viewed from the front, the front edges at the opening of the cube form a rectangular frame, and the riser portion also forms a smaller rectangular frame adjacent to the front edges. The riser portions adjacent to the ledges prevent the doors from swinging in and also limits the inward travel of a drawer insert.

There is a rear transverse engagement slot formed in the surface of the inner wall of the basic rectangle or cube panel that is used for holding in place a square or rectangular piece of Masonite particle board. The engagement slot is formed slightly inboard from and parallel to the rear edge of the rectangle or cube panel. The engagement slot runs the entire width of the panel. There can also be a plurality of parallel spaced guideways or channels running parallel to the top and bottom edges and between the front ledge and the rear engaging slot. In an alternate version, the the rear engagement slot for holding the back wall could be eliminated, and the the back panel could be fastened with glue or clips to the rear border of the cube. Appropriate holes would have to be drilled in the back edges of the panels, and the back panel if push-in clips were used.

During the assembly process when the four panels are being aligned together and while the front door is being positioned in the ledges of the panels, the four edges of the rectangular-shaped Masonite rear panel must be inserted into the rectangular-shaped engagement slot located, inside the back rim area and formed by the four engagement slots in each panel. The inserted piece of Masonite forms the back wall of the assembled cube or rectangle.

The series of parallel spaced front-to-back guideways or channels formed in the raised platform of the inner wall are intended to hold shelves or drawers so that the modular cube or rectangle can have a series of horizontally spaced shelves spaced one above the other. The shelves could also be placed vertically to form partitions in the space formed by the four walls forming the square or rectangular cube. The series of parallel spaced transverse channels also allow for one or more drawer inserts to be positioned in the cube. There can be a combination of drawers and shelves. When drawers are used, the door cannot be used. The cube drawers and shelves are interchangeable with the rectangle unit. The wide drawers and shelves are interchangeable with the large cube and the rectangle unit when it is used sidewise.

The basic panel unit also has four pairs of complementary cylindrically-shaped recesses or holes formed in both the outer wall and inner wall. The four holes in the inner wall are superposed with the four holes in the outer wall. The four pairs of opposed recesses are formed towards each corner of the cube panel. The depth of each recess is about half the thickness of the panel. At the bottom of each cylinder is a removeable plug. The purpose of these arrays of cylindrical recesses is to interlock the modules after they have been assembled and stacked according to the user's wishes. This will prevent the modules from sliding transversely relative to each other. An integral wall unit can created. The recesses or holes are positioned so that they will match up with the recesses or holes of an adjacent cube module or an adjacent rectangular module. The two adjacent holes can have the bottom removeable plugs cut out with a knife so that a fastener such as a bolt can be placed there through and tightened down with a nut to hold the adjacent facing panels and lock them into position. A cylindrically-shaped dowel with a longitudinal concentric bore and being about twice the length of the depth of a single recess can be positioned in the facing recesses between two adjacent panels so that the fastener shaft can pass through the bore of the plug, the dowel centers and holds the bolt and adjacent panels in a locked position.

The drawer insert slides in and out of the cube by means of the series of channels formed in the inner wall of each panel. The drawer insert has a face plate, a three-section bendable side wall and a bottom. The side wall piece is formed by a blow molding process and has a left portion, a middle portion, and a right portion for forming the three side walls of the drawer insert. The left and right portions are each connected at one end to the ends of the middle portion by an integral plastic band which has sufficient clearance to allow the three pieces to be bent at right angles to form the U-shaped side wall. The unattached ends of both left and right portions are secured to the back of the face plate. The back of the face plate has a pair of vertically oriented elongate oval-shaped depressions towards the upright ends that are of sufficient dimensions for receiving each unattached end of the left and right side walls. The ends of the face plate each has a pair of cutaway areas adjacent the oval depression for allowing a fastener to be inserted in a fastening hole through the end of the side portion and into the body of the face plate. The back of the face plate has a lower horizontal slit for receiving the front edge of the rectangular bottom, which is a Masonite piece of particle board. The segmented side wall also has a lower horizontal slot running along the inside of the left, middle, and right portions for receiving the other three sides of the Masonite bottom. When the ends of the left and right portions of the side walls are fastened to the back of the face plate, the horizontal slots forms a rectangular groove around the inner rim of the drawer insert for securing the bottom particle board panel.

The top edge of the face plate has a cutaway portion positioned medially for allowing a snap-on handle to be snapped into place. The cutaway portion as a pair of opposed bosses at the top corners of the cutaway, and the bottom edge has a pair of upper and lower concave grooves for receiving the open bottom of the snap-on handle. The snap-on handle forms a inverted J-shape and an inverted opposed U-shape in cross section. The J-shaped portion forms the handle grip for receiving the user's fingers, and the inverted U-portion snaps over the lower edge of the cutaway to lock the handle in place. The hanging doors also can have the same type of cutaway for holding the snap-on handle.

BRIEF DESCRIPTION OF THE DRAWINGS

FIG. 3 is an exploded view of a cube module illustrating the four identical interlocking panels, the four identical interlocking curved moldings, the back panel, a shelf, and a drawer insert.

FIG. 3A illustrates an enlarged view of the small side-by-side tab-and-notches encircled as 3A in FIG. 3.

FIG. 4 is fragmentary cross-sectional view taken along the line 4—4 of FIG. 2 illustrating the dowels and the notch and tab connections formed in the interlocking panel.

FIG. 5 is a cross-sectional view of the front of the drawer panel taken along the line 5—5 of FIG. 3.

FIG. 9 is a partial fragmentary cross-sectional view taken along the line 9—9 of FIG. 8 showing a side view of the locking means for the door and the socket in the ledge of the panel, and the riser portion of the panel that prevents the door or a drawer face plate from entering into the interior space of the unit.

FIG. 10 is a fragmentary view of a portion of the three part drawer panel that forms the sidewalls of the drawer insert.

FIG. 10A illustrates the sidewalls illustrated in FIG. 10 being bent at 90 degrees to form the corners of the drawer side walls of the drawer insert.

FIG. 11 is a partial fragmentary sectional view illustrating how three modular units are interlocked to one another by utilizing the cylindrical holes, the dowels, and fasteners.

FIG. 12 is a partial perspective view illustrating how the three part bendable drawer panel is inserted and fastened to the faceplate of the drawer insert.

DETAILED DESCRIPTION OF THE INVENTION

Figure 1:
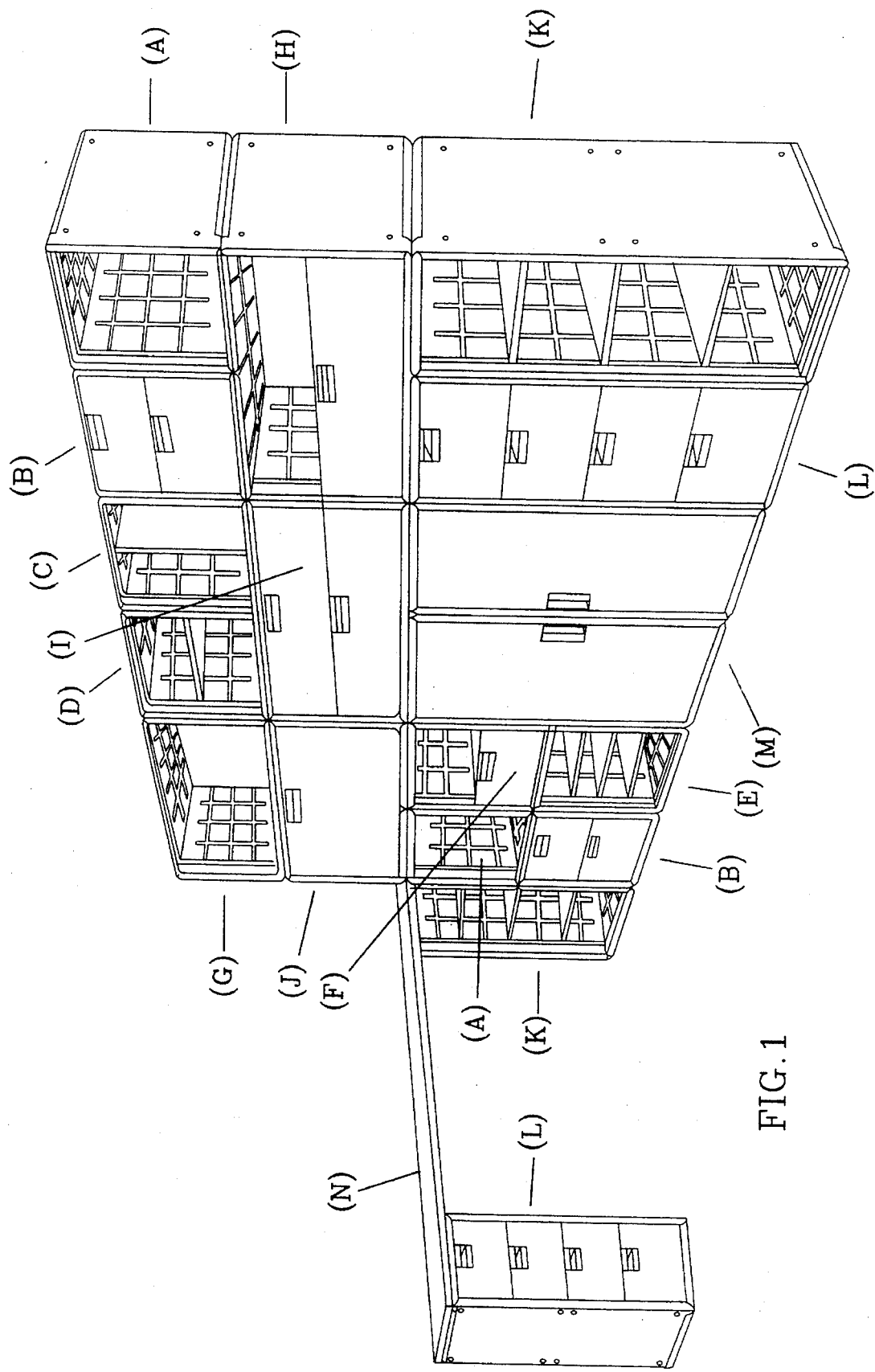
FIG. 1 is a perspective view of the invention illustrating the cube module, the large cube module, and the rectangular module. Several of the units have shelves, drawer inserts, and doors in various configurations. A desktop and pedestals for the desk top are also illustrated.

Referring now to FIG. 1, there is disclosed a perspective view of a complete stackable interlocking modular storage unit. Several versions of the modular cube, large cube, and rectangle units are illustrated as follows:

A. the basic stacking cube unit (A) without shelves or drawers;

B. the cube unit (B) with two drawer inserts forming a two drawer chest;

C. the cube unit (C) with one vertical shelf or partition;

D. the cube unit (D) with one horizontal shelf or partition;

E. the cube unit (E) with three horizontal shelves or partitions;

F. the cube unit (F) with one drawer insert;

G. the basic stacking rectangle unit (G) positioned, sidewise, and without any shelves or drawers;

H. the rectangle unit (H) positioned sidewise, and with one elongate drawer insert;

I. the rectangle unit (I) positioned sidewise, and having two elongate drawers for forming a two drawer chest;

J. the rectangle unit (J) positioned sideways and having a downwardly swinging door;

K. the basic stacking rectangle unit (K) positioned upright with three cube-sized horizontal shelves, which are identical to the shelves used in modular units (D), (C), or (E);

L. the rectangle unit (L) positioned upright with four cube-sized drawer inserts for forming a four drawer chest. The drawers are identical and interchangeable, and are identical to those drawers used in cube modular units (B) and (F);

M. the large cube unit (M) that is four times larger than the cube unit (A) and having a pair of front opening interchangeable hanging doors identical to the door used in unit (J).

N. the table top (N), which can be positioned between two spaced apart pedestals such as upright units (K) or (L) for forming a desk or integral bench.

The basic cube unit labelled (A), (B), (C), (D), (E), or (F) in FIG. 1 is referred to as the "cube". It is called a cube for discussion purposes even though not all of its sides are equilateral. The modular cube unit has the following dimensions: 16" height; 16" width; and a 17" depth. The extra one inch depth provides for additional interior space for the shelves and drawers. However, the scope of the invention is not to be limited to any particular height-width-depth combination. Nearly any combination of dimensions could work equally well. The cube is fabricated from four identical panels 2. Each panel 2 is 17" deep, 15¼" high, and 1" thick.

The basic rectangular unit labelled (G), (H), (I), (J), (K), or (L) in FIG. 1 is referred to as a "rectangle" modular unit. It is a rectangle, just as the cube is a rectangle. The rectangle modular unit has the following dimensions: 32" height; 16" width; and a 17" depth. The rectangle modular unit has the same dimensions as two cube units placed side-by-side against a wall. The rectangle is fabricated from four panels. It uses two of the identical panels 2 used in the cube. It also uses two identical elongated rectangular panels 3. The elongated rectangle panel 3 is a stretched out version of the cube panel 2. Each rectangle panel is 17" deep, 31¼" high, and 1" thick. The depth and thickness are the same as the cube panel 2, but the height is 16 inches greater than the cube panel 2. The rectangle unit is fabricated from two identical cube panels 2 that are opposed to one another, and two identical rectangle panels 3 that are opposed to one another to form the four sides of the unit. The beveled edges 4 and 6 and the grooves 20 and 22 of both types of panels 2 and 3 are identical for full compatibility with each other.

The large cube unit labelled (M) in FIG. 1 is referred to as a "large cube" modular unit. The large cube modular unit has the following dimensions: 32" height; 32" width; and a 17" depth. The large cube unit has the same dimensions as four cube units placed together against the wall, two cubes high and two cubes wide. The large cube unit has the same dimensions as two rectangle units placed side-by-side. The large cube unit is assembled from four identical rectangle units 3. The large cube can be used as a small closet for hanging clothes from clothes hangers. A rod can be placed horizontally in the interior towards the top. The intersecting rib detents 28 and channels 56 provide several securement locations where the ends of the rod could be positioned. A pair of support brackets (not shown) to hold either end of the rod in one of the channels 56 is preferable. When a series of shelves are used in the large cube, holes can be drilled in the side wall adjacent an edge of a shelf to insert a push-in clip to strenghten the unit. Or, a rigid wire rod could be passed between the two side walls and a shelf to help support the shelf and increase the structural integrity of the unit. Additionally, a vertical bar could, be positioned between the top and bottom panels at the front with shelve holders to provide support to the wide shelves at their middle.

The particular overall dimensions of the cube, the rectangle, and the large cube units are essential to the invention, because nearly any combination of the three can be arranged and rearranged to form an integral stacked modular storage system such as the one illustrated in FIG. 1. Each unit is packaged separately, and can be purchased separately. The user simply purchases the units necessary to form the type of system the user desires. Additional units can be purchased later to add to the system, if desired. The table top (N) can also be purchased to form a desk or integral bench.

As previously stated, nearly any combination of the height-width-depth dimensions of the three units can be used. The only limitations are that all three units must have the same depth, the rectangle must be twice the height or width of the cube, and the large cube must be twice the height and twice the width of the cube, or twice the height, or twice the width of the rectangle. Expressed another way, the cube unit when viewed directly at its front has a 1:1 height-width ratio, also called an aspect ratio. When viewed from the front, the rectangle unit has a 1:2 aspect ratio, and the large cube has a 2:2 aspect ratio relative to the cube. All of the modular units along with the shelving, drawers, and doors can be assembled easily without any tools being required. Easy to follow instructions allow the user to assemble the unit(s) by hand.

Figure 2:
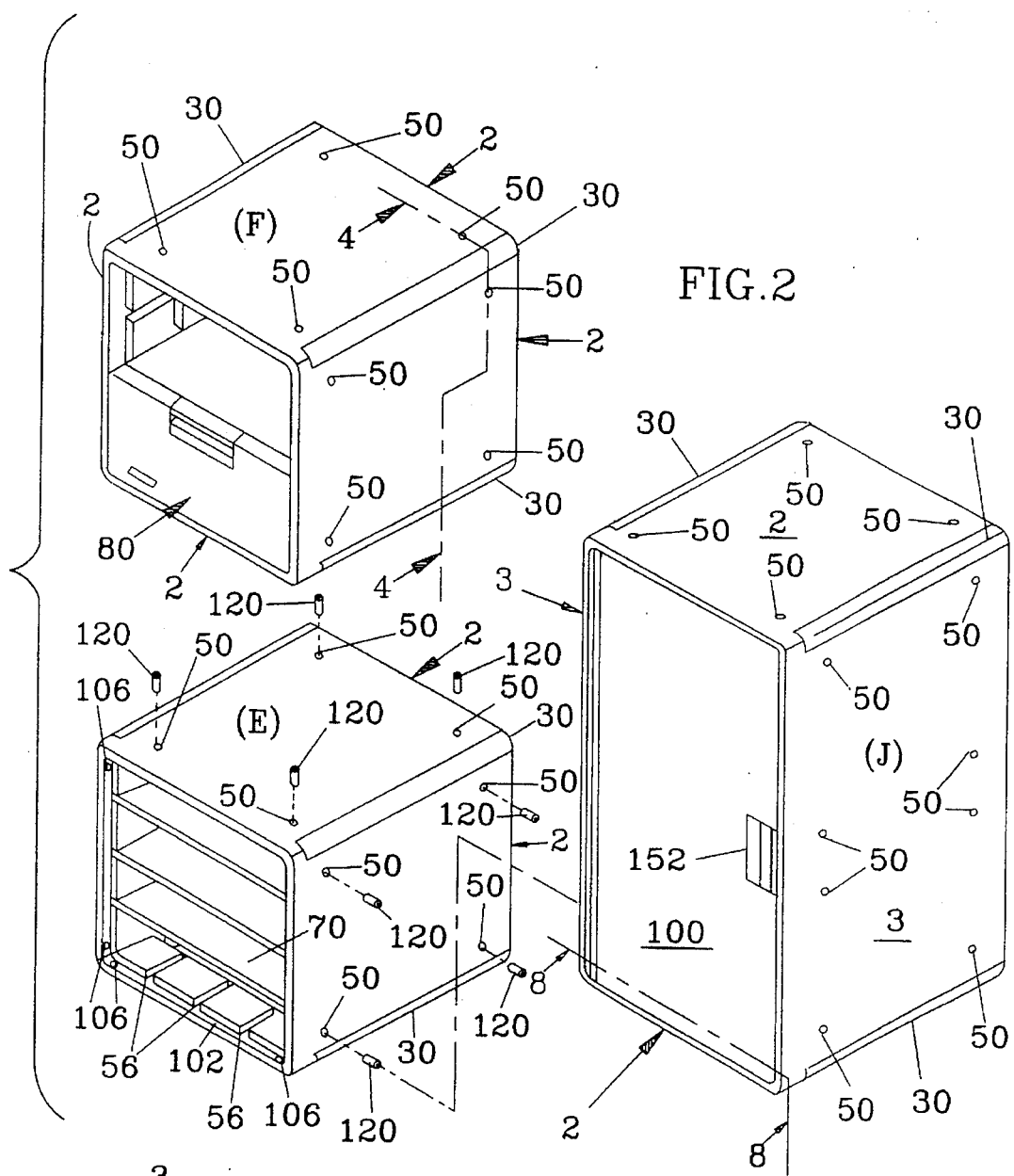
FIG. 2 is an isometric view of two cube units and one rectangular modular unit exploded from one another to show how the modular units are fastened together utilizing the matching cylindrical recess, the cylindrical dowels and fasteners.
Figure 8:
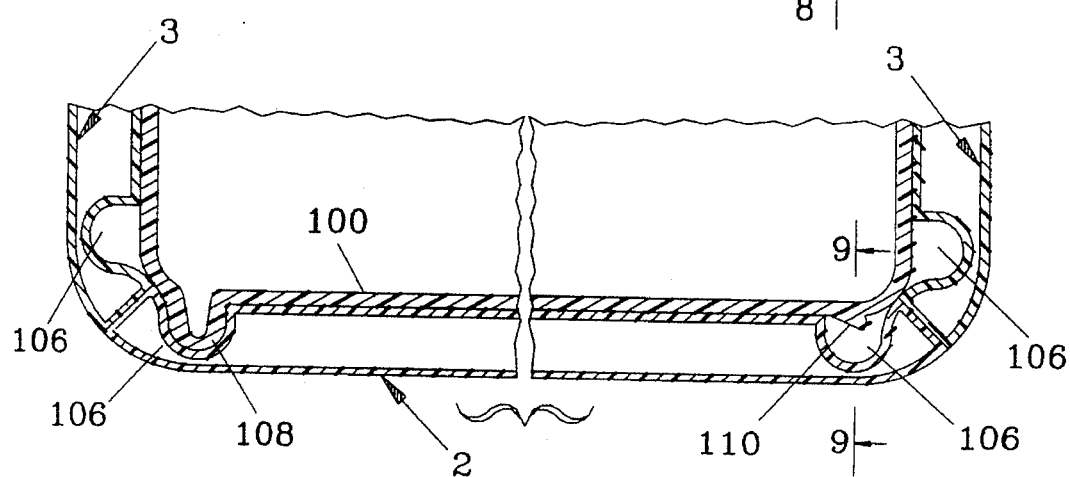
FIG. 8 is a fragmentary cross-sectional view taken along the line 8—8 of FIG. 2 showing the knob and catch at the bottom of the door with each positioned in the the two sockets in the ledge of the panel.

FIG. 2 illustrates in perspective two cube modular units (E) and (F) about to be stacked one on top of the other, and a nearby rectangle modular unit (J) about to be placed adjacent to (E) and (F). FIG. 2 clearly illustrates how the interlocking modular units are interconnected or otherwise locked to one another. As can be seen, there are four cylindrically-shaped cavities collectively numbered as 50 and formed in the outer wall and near each corner of each of the interlocking panels in the cube unit. There is a double set of identical cavities 50 in the rectangle unit. The double set of cavities in the rectangle panel 3 form a pattern identical to the pattern of cavities formed on the side panels 2 of cubes (E) and (F). The cavities 50 on the right side panels 2 of (E) and (F) automatically align with the cavities on the left side panel 3 of (J). Similarly, the cavities in the top panel 2 of (E) automatically align with the cavities in the bottom panel 2 of (F), because the cavities formed in the square panels 2 have the same pattern. The opposed top and bottom panels 2 are identical and form a mirror image with each other. The interlocking cylindrical cavities 50, dowel pins 120, and fasteners 126 and 128 will be discussed in further detail, infra.

FIG. 3 is an exploded isometric view showing the basic components which comprise the typical cube modular unit (A) along with a drawer insert 80 and a shelf 70 for the cube. There is a wide drawer and shelf available for use with the rectangle unit when the rectangle unit is placed on its side such as unit (I) illustrated in FIG. 1. There is clearly illustrated four of the identical basic square interlocking panels 2 used in the cube with each panel having a top edge 4, a bottom edge 6, a front edge 8, a rear edge 10, an inner wall 12, and an outer wall 14. The four identical generally square-shaped double-walled hollow plastic interlocking panels 2 are spatially positioned so that when they are assembled, they will form a regular hollow parallelepiped shaped structure commonly described as an open-ended box (A) lying on its side without a lid or a bottom. The four identical panels 2 facing each other, which form the basic cube unit are arranged so that the top edge 4 of one panel abuts at right angles to the bottom edge 6 of an adjacent panel. Also shown in FIG. 3 is the square retaining wall 16 that forms the back panel of the cube unit (A). Both the top edge 4 and the bottom edge 6 have inwardly sloping or beveled surfaces so that when the top edge 4 of one panel 2 touches the adjacent bottom edge 6 of an adjacent panel 2, the two will meet and form a mitered joint in cross section, because both edges are beveled at a 45 degree angle sloping towards the inner wall 14. The top beveled surface and the bottom beveled surface have the same mirror image in profile. It is within the scope of this invention that the beveled edges can be cut at angles other than 45 degrees. For example, the bottom edge could be cut at a 30 degree angle and the top cut at a 60 degree angle. The sole requirement is that both angles must add up to 90 degrees.

There are two extended grooves formed in the outer wall. The grooves are formed by the mold during the blow molding process when the double-walled hollow panel is fabricated. The panel 2 or 3 is strong and light weight. Each groove is parallel to and slightly inboard from the top edge 4 and the bottom edge 6. One groove is referred to as the top elongate retaining groove 20, and the other groove is referred to as the bottom elongate retaining groove 22. Both grooves 20 and 22 are positioned the same distance from their respective beveled edges 4 and 6. The narrow walls forming both retaining grooves are positioned radially along the imaginary 90 degree angle lines emanating from the circular center corresponding to the arc formed by the radiused curve on the rounded edge adjacent to the beveled edge. When the adjoining top edge 4 of one panel and a bottom edge 6 of an adjacent panel 2 are positioned together, the pair of grooves 20 and 22 line up to allow for an interlocking corner molding 30, sixteen inches in length to be slid into place along the length of both grooves 20 and 22 to interlock the two corners of the panel. Both elongate grooves 20 and 22 are open at the back edge 10 of the panel 2 but they terminate one inch before they reach the front edge 8 of the panel. Both grooves are about a half inch deep and sixteen inches in length, or less than the seventeen inch length of either top and bottom edges 4 and 6 of the panel 2 or 3. The curved corner molding 30 can be the same length or less than the length of the grooves 20 and 22. The top edge 4 and bottom edge 6 of the panel 2 or 3 between either groove 20 or 22 and either beveled edge 4 or 6 are both curved and recessed to a dimension of the same size and thickness as half of the curved corner molding 30, so that when the molding 30 is slid into the grooves 20 and 22, the outer surface 32 of the molding 30 forms a curved flush surface with the outer walls 14 of the panels end creates a smooth surface having radiused edges where the molding 30 is at the four joined abutting corners of the lidless and bottomless box-like structure. The curved interlocking corner molding 30 includes a pair of lengthwise opposed radial runners 34 and 34 extending lengthwise along both edges of the molding 30 so that the runners 34 can slide in between the opposed pair of narrow walls, which form each of the retaining grooves 20 and 22 in the interlocking panels 2 or 3. The runners 34 and 34 form fingers in cross section. The curved outer surface 32 and the curved inner surface 36 have the same curvature so that the curved inner surface 36 forms a snug fit with the radiused corners of both edges 4 and 6 of the panel 2 or 3. The material used to make the corner molding allows tension to be exerted by the fingers at the abutting corners formed by the mating panels to increase the rigidity of the modular unit after it has been assembled from its parts. The corner molding is made from a hard polyvinyl chloride plastic in an extrusion process. The corner molding could have a pair of flat right angled surfaces rather than the outer rounded surface 32. This would result in the edges being squared off rather than rounded. The inner curved surface 36 would remain the same.

There are a pair of complementary tabs 60 and notches 62 formed in the beveled panel edges 4 and 6 so that they can interlock with one another to help prevent sliding movement between the two mating ends of the panels. The top edge 4 of the panel has a pair of tabs 60 spaced about five inches apart and the bottom edge 6 of the panel has a pair of equally spaced notches 62 so that when the top edge 4 of one panel 2 or 3 mates at a right angle with the bottom edge 6 of the adjacent panel 2 or 3, the pair of tabs 60 on the top edge 4 mate with the pair of complementary notches 62 on the bottom edge 6 and function as an additional interlocking means to increase the rigidity of the modular system and to keep the panels in place. As an alternative, the tabs 60 could be in the bottom edge, and the notches 62 could be in the top edge. Either way, the pairs of tabs and notches would function the same way. The corner molding 30, the retaining grooves 20 and 22, and the beveled edges 4 and 6 provide the means for locking together the abutting panels.

There are also two pairs of small complementary side-by-side tab-and-notches 64–63 illustrated in the enlarged view in FIG. 3A. One pair is formed on the top edge 4 and near the front edge 8, and the other pair is formed on the bottom edge 6 and near the front edge 8 of the panel 2 or 3. The pair in the top edge has the tab 64 closest to the front edge and the adjacent notch 63 away from the front edge. The positions are reversed on the bottom edge. The juxtapositions could be reversed. When the adjacent edges 4 and 6 of two opposed panels touch, the complementary pairs of smaller notch-and-tabs 63–64 and tab-and-notches 64–63 lock together to assist in preventing transverse movement of the panels relative to each other. The larger tabs 60 and larger notches 62 on the beveled edges are the locking means for preventing transverse movement of the panels after they are assembled. The complementary notch-and-tabs could be defined as the supplemental locking means also for preventing displacement of the panels.

There is a rear transverse engagement slot 66 formed in the surface of the inner wall 12 of the panel 2 or 3. It is used for holding in place a rectangular piece of Masonite particle board 16, which forms the back of the unit. The engagement slot 66 is parallel to and placed slightly inboard from the back edge 10 of the panel 2 or 3. This slot 66 is about ⅜ inch deep, about a ¼ inch wide, and runs the entire width of the panel and forms a continuous groove around the inside perimeter of the modular unit when the four panels are interlocked with one another. The back wall 16 is square-shaped for the cube unit. It is 15 inches square and ¼ inch thick. In the rectangle unit, it is the same width but twice the length as the cube back wall. The back wall 16 is placed into the four slots 66 as the panels are being assembled. The basic cube modular unit can be assembled by initially placing a first panel 2 and a second identical panel 2 at right angles with the edges 4 and 6 touching, and then sliding in a first corner molding 30 into the grooves 20 and 22. Afterwards, a third panel 2 is aligned at right angles to the unattached end of the second panel. A second corner molding 30 is slid into place to connect the second panel to the third panel. The back panel 16 is then slid into place before the fourth panel 2 is assembled. The three-sided groove 66 formed by the panels 2 holds the panel 16 in position. Afterwards the fourth and last panel 2 is positioned to form the box and the third and fourth moldings 30 are slid into place at the other two unsecured corners to complete the assembly. All four panels 2 and the back panel 16 are orthogonal to one another. Afterwards, the unit can be finished off by having one or more shelf partitions 70 slid into place. The lateral edges of the shelf, which slide into the channels 56 have a pair of bumps 71 to hold the shelf in the channel 56. One or more drawers 80 can also be slid into place along with or in place of the shelves. The rectangle or large cube is assembled in the same manner. Two opposed rectangle panels 3 are substituted for two opposed square panels 2 to form the rectangle unit, and four rectangle panels 3 are used in place of the four square panels in the large cube unit. Various combinations are illustrated in FIG. 1. If it is desired to have a hanging door 100 in place of any drawers 80 for the front, then the door 100 will have to be fitted in the front of the unit during the assembly process before the fourth and last panel is locked into place.

The front transverse edge 8 of the basic panel 2 or 3 has a flat transverse ledge 102 formed adjacent to the front edge. The ledge 102 abuts with a riser portion 104 located between the ledge 102 and the platform forming the inner wall 12. The ledge 102 and riser portion 104 are parallel to and inboard from the front edge 8. The ledge 102 runs the entire width of the front edge 8 of the panel 2 or 3. The riser portion 104 provides an abutment means to stop the drawer 80, or the door 100, if the door is to be included. The ledge is formed when the four panels are interconnected. The ledge forms a rim or flange around the opening of the front of the cube itself as clearly illustrated in FIGS. 2 and 7. Additionally, there are two circular dome-shaped recesses 106 or sockets formed in the surface of the ledge 102. One recess 106 is placed near the top edge 4 of the panel 2 or 3 and the other identical recess 106 is placed near the bottom edge 6 of the panel 2 or 3. This allows for the hanging door 100 to be installed in a swinging fashion. The door 100 is illustrated as attached to the front opening of the rectangular modular unit in FIG. 7 where it would be routinely installed. The pair of spaced apart recesses 106 in the ledge 102 are used when a swinging door is mounted at the front opening of the cube, rectangle, or large cube unit. The typical door will have the same rectangular shape as the rim formed by the ledges 102.

Figure 7:
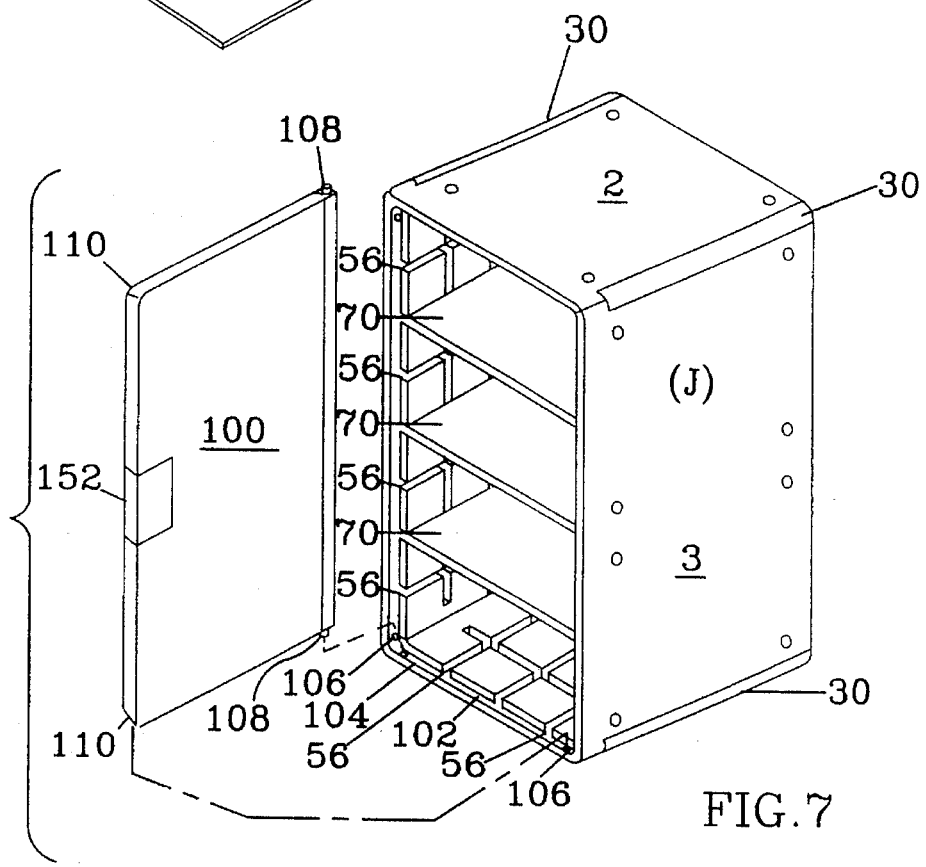
FIG. 7 illustrates a rectangular modular unit having three shelves and the door.

The door has a double wall hollow construction, is made from from a blow molding process, and is one inch thick. Both the top and bottom edges of the door 100 will have a pair of circular knobs 108 and catch projections 110 spaced apart the same distance as the two recesses 106 are spaced apart on the ledge 102, at opposite ends on each door edge. When the four plastic panel units and accessories are in the process of being assembled to form the cube unit, the door is initially positioned in the front before the fourth and last panel is locked into place. The top and bottom knobs 108 of the door are positioned in the sockets 106 in the opposite facing top and bottom panels. This provides a pivot point or joint at each knob 108/recess 106 connection. The opposite pair of opposed circular recesses in the facing top and bottom panels each acts as a detent to lock the catch projection 110 on the top and bottom edge of the door. The door is locked by the catches 110 when the door is closed on the modular unit. The door is symmetrical transversely and therefore can be mounted either left or right. The pairs of knobs and catches on the top and bottom of the door, and the pair of recesses 106 formed in the ledge 102 of the panel are designed so that the door can be mounted universally as a left or right opening door. This eliminates tile need to have two separate types of doors for the basic cube unit. The door for the rectangle or large cube unit has the same top and bottom edges as the door for the cube, but the rectangle door as illustrated in FIG. 7 is about twice the height of the cube door.

The basic square panel 2 also has four pairs of complementary cylindrically-shaped opposed recesses or cavities 50 and 52 formed in both the outer wall 14 and the inner wall 12. Each of the matching inner wall and outer wall cylindrical pairs are in a mirror-image fashion to each other. The cavities are formed by the mold during the blow molding process. A thin circular plastic membrane is left to separate the two cavities 50 and 52. The membrane has a small concentric depression that can be cut out with a knife like a plug 51 to form a small hole 124 between the inner cavity 50 and the outer cavity 52. Both cavities have the same dimensions. The pairs of cavities 52 and 50 are located towards each corner of each panel. Each cavity forms a round depression in the surface of the wall and is about a half inch deep. The purpose of these arrays of cylindrical holes is to interlock the modular unit after they have been assembled and arranged according to the user's wishes. This prevents the units from sliding about relative to each other. An integral storage system can be created. The cavities 50 and 52 provide a way for interconnecting the modular units by means of fasteners 126 and 128. A cylindrically-shaped dowel pin 120 having the same diameter and twice the length of either cavity can be inserted into adjacently aligned cavities in the outer walls of adjacent units as illustrated in FIG. 11. FIG. 2 illustrates where the series of dowel pins 120 are placed in the array of cavities 50 in the outer walls of the units. The concentric bore 122 in the dowel pin keeps the fasteners 126 and 128 properly aligned. A number 10×1½ nut, bolt and washer combination is recommended for the fastener. The matching cylindrical cavities, the dowel pin and the fastener provide the means for locking adjacent units together. It is to be understood that the scope of this invention is not to be limited to cylindrical cavities and cylindrical dowels. The cavity could have any type of a three-dimensional polygonal shape with a matching polygonal dowel. Also, the dowels could function like friction plugs so that the plug could hold adjacent units together by a frictional fit with a common plug positioned between two facing cavities without resorting to a nut and bolt through the dowel and side walls. Alternatively, matching strips of Velcro could be glued to the side walls to hold the units together with or without the plugs.

The inner wall 12 of the basic panel 2 or 3 resembles the surface of a waffle iron in that the inner wall 12 has a series of horizontally spaced parallel channels 56 and a series of vertically spaced parallel indented strengthening ribs 28. The channels, 56 are for supporting the runners 95 on the drawer insert 80 or the shelf 70 with its oppositely placed bumps 71. The inner wall 12 and the outer wall 14 are formed from a mold by a blow molding plastic process so that there is an air cavity in the interior of the panel. The three vertical indentations 58 in the inner wall form interior ribs to increase the strength of the panel. It is foreseeable that the basic panel could be made as a solid one-piece unit. However, the hollow interior provides for a light weight unit, and uses less plastic material to reduce the manufacturing costs.

Figure 6:
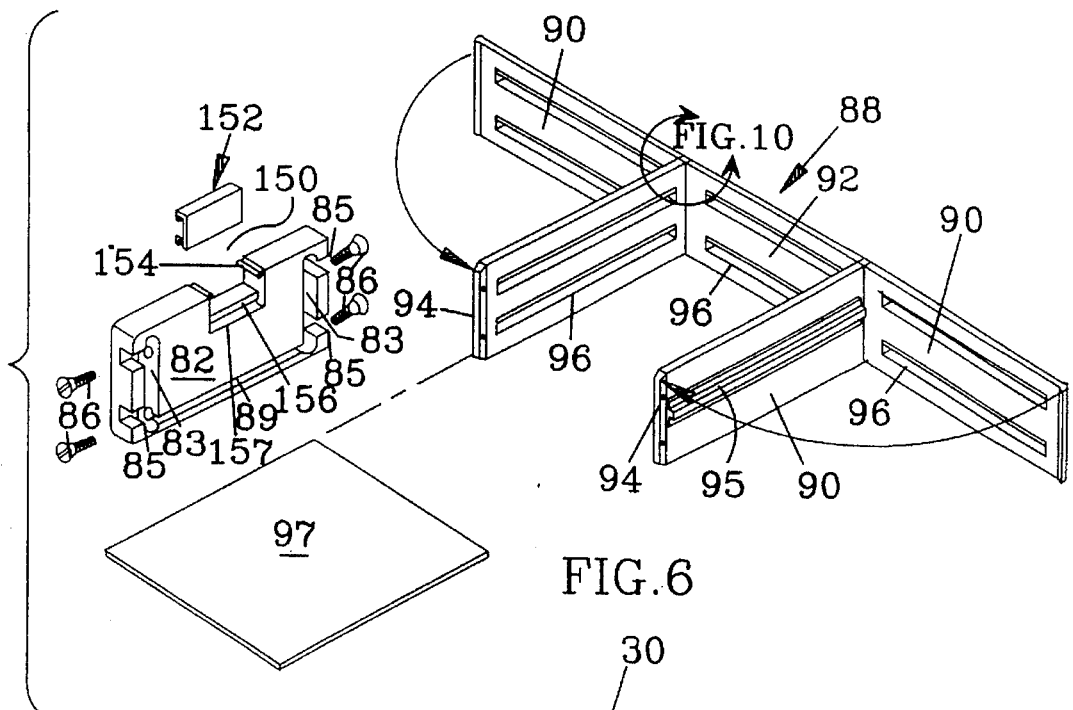
FIG. 6 illustrates in an exploded view of the components that form the drawer insert.

The drawer insert 80 illustrated in FIGS. 3 and 6 will now be discussed in further detail. The drawer insert is comprised of four separate pieces as follows: the plastic face plate 82; the rectangular Masonite particle board bottom 97; the plastic snap-on handle 152; and the three partition plastic side wall 88, which forms the sides and back of the drawer insert. As illustrated in FIGS. 6, 10 and 10A, the side wall 88 is bent twice to form the two sides 90 and the back 92 of the drawer insert. The left and right portions 90 of the side walls are each connected at one end to the ends of the middle portion 92 by an integral bendable plastic band 91 which has sufficient clearance to allow the three sections 90, 90 and 92 to be bent at right angles to form the U-shaped side wall 88. The lateral sections 90 are each 15" long and 6" high. The back section 92 is 13" long and 6" high. The unattached ends 94 of both left and right portions 90 are secured to the back of the face plate 82. The back of the face plate has a pair of vertically oriented oval-shaped depressions 83 towards the upright ends that are of sufficient dimensions for receiving each unattached end 94 of the left and right walls 90 and 90. The ends of the face plate 82 each has a pair of cutaway areas 84 and 85 adjacent to each oval-shaped depression for allowing a fastener 86 to be inserted through the hole 99 in the end 94 and partially through the fastening hole 87 and into the body of the face plate.

The oval-shaped depression, the cutaway portions, the ends of the side panel, and the fasteners provide the means for attaching the side panel to the face plate.

The back of the face plate has a lower horizontal groove 96 for receiving the front edge of the rectangular bottom 97, which is a Masonite piece of particle board. The three-partition side wall 88 also has a lower horizontal groove 96 running along the inside of the left 90, middle 88, and right 90 portions for receiving the other three sides of the Masonite bottom. When the ends 94 of the left and right portions 90 are fastened to the back of the face plate 82, the horizontal groove 96 in the segmented panel 88 and the groove 89 in the back of the face plate form a rectangular groove around the lower inner rim of the drawer insert 80.

The top edge of the face plate has a cutaway portion 150 positioned medially for allowing a snap-on handle 152 to be snapped into place. The cutaway portion as a pair of opposed bosses 154 at the top corners of the cutaway, and the bottom edge has an upper and lower pair of horizontal concave grooves 156 and 157 on both sides of the face plate for receiving the open bottom of the snap-on handle. The snap-on handle, in cross section, forms an inverted J-shape situated above an inverted U-shape configuration. The inverted J-shaped portion 160 forms the handle portion for receiving the user's fingers, and the inverted U-shaped portion 162 is the locking portion that snaps over the lower edge of the cutaway portion 150 to lock the handle in place. The bottom of the handle has an elongate horizontal convex projection 164 that mates with the lower concave groove 157 in the face plate to keep the handle 152 locked in place. The hanging doors 100 can also have the same type of cutaway structure 150 and the snap-on handle 152.

When the drawer insert 80 is being assembled, the three partition side wall 88, which forms the back 92 and the two side panels 90 is initially bent so that the interior groove 96 is fitted along the two sides and back edges of the bottom drawer panel 97. Afterwards, the abutment ends 94 of the two side panels are slipped into the pair of oval-shaped depressions 83 oppositely placed on the inside of the face plate while the the front edge of the panel 97 is slipped into the groove 89 on the back of the face plate. Afterwards, the two pairs of clip fasteners 86 are passed through the holes 96 in both panels 90 and the holes 87 in the face plate. The clips are used to lock the side panel to the face plate so that the drawer insert forms a rigid box-like structure. The fasteners 86 can be any type of fastening means such as a screw, rivet, or push-in clip. The preferred fastener is a clip that has a larger circular head with a shank extending from it with a pointed end. The shank is made up of a series of spaced apart discs. The discs from a series of ribs on the outside of the shank of the clip. The discs are flexible and have a diameter larger than the holes 87 and 99 through which a portion of the shank passes. The head of the fastener is pressed with one's finger while the point is guided through the holes 87 and 99. A clicking noise is heard as each successive disc passes through the holes. When the assembler can no longer force the clip any further through the holes, the pressure exerted by the assembler is relaxed, and the discs on the shank unflex and lock the panels 90 to the face plate 82. The clips are self-retaining and will not work themselves loose after they have been inserted.

There are a pair of left and right side runners 95 formed on the two outer side walls of the side panels 90. They are positioned medially and longitudinally. They function as the runners for guiding and holding the drawer insert along the channels 56 formed in the inside wall 12 of the modular unit. The runners are on a raised base 98, and they are rounded at their ends as clearly shown in FIG. 12. In the wide drawer as illustrated in version (I) in FIG. 1, Everything is very much the same as in the cube drawer. The face plate 82 has the same handle 152, cutaway 150, oval depressions 83, cutaway areas 85, and groove 85. However, the make the face plate wider, both sides of the cutaway 150 have been widened or stretched out. The back 92 of the three partition side wall is widened or stretched a like amount, and the bottom panel 97 is widened a like amount.

The invention has rounded edges at all exposed corners and edges for safety reasons so that the system can be used safely in a child's room. The hollowed out pieces provide light weight components, which allows the system to be used with little effort by children. The face plate 82 and the door 100 can be available in a variety of colors to match the user's decor.

While the present invention has been shown and described herein in what is conceived to be the best mode contemplated, it is recognized that departures may be made therefrom within the scope of the invention which is therefore not to be limited to the details herein, but is to be afforded the full scope of the invention.

We claim:

1. A modular storage unit that includes a plurality of interlocking panels, each panel comprising:

a rectangular-shaped panel member having beveled top and bottom edges, front and rear edges and inner and outer walls;

a top retaining groove in said outer wall that is parallel to and spaced apart from said top edge;

a bottom retaining groove in said outer wall that is parallel to and spaced apart from said bottom edge;

a tab on one of said beveled edges;

a notch complementary to said tab on the other one of said beveled edges;

a channel in said inner wall that is parallel to said top and bottom edges for slidably engaging a drawer or shelf;

said panels being positioned with their bottom edges adjacent another one of said panels' top edges to form said modular storage unit such that said tabs and notches are engaged, thus preventing transverse movement of said panels; and a plurality of curved moldings, each molding slidably engaging said top retaining groove in one of said panels and said bottom retaining groove in another adjacent one of said panels.

2. The modular storage unit of claim 10, wherein each panel further comprises:

a first tab-and-notch pair placed side-by-side on one of said beveled surfaces and adjacent said front edge;

a second tab-and-notch pair complementary to said first pair placed side-by-side on said other beveled surface and adjacent said front edge;

said first tab-and-notch pair mating with said second tab-and-notch pair on said adjacently positioned panel prevent lateral displacement of said panels.

3. The modular storage unit of claim 1, wherein said storage unit has an open front and each of said panels has a ledge on its inner wall adjacent to and parallel with its front edge, said ledges each having a pair of spaced apart recesses so that two opposed rectangular members in said unit have two opposed ledges with two pair of opposed and aligned spaced apart recesses, further comprising:

a rectangular-shaped door member having a pair of opposite edges for hanging in said open front of said storage unit;

first and second pairs of spaced apart knob-and-catch projection on said opposed edges of said door member;

said knobs being positioned in said aligned recesses on opposed ledges to form ball and socket joints which allow said door member to swing open and closed in said open front of said storage unit; and said catch projections being positionable in said spaced apart and aligned recesses on said opposed ledges to form a latch for keeping said door closed.

4. The storage unit of claim 3, wherein said door member is symmetrical transversely so that said door member can be mounted to swing open either left or right.

5. The storage unit of claim 1, further comprising:

a full length receiving slot in each of said panel members' inner walls and parallel to and spaced apart from said rear edges; and a rectangular back panel slidably positioned in said receiving slots in said panels to form a back wall of said storage unit.

6. The storage unit of claim 1, wherein said channel includes three parallel spaced apart channels in said inner wall, said middle channel being coincident with a medial line running parallel to and midway between said top and bottom edges, said channels forming a series of three pairs of aligned horizontal channels and three pairs of aligned vertical channels in said storage unit, further comprising:

a rectangular-shaped shelf member having two pairs of opposite edges for engaging with one of said opposite pair of said channels in said inner walls to form a horizontal shelf, or a vertical partition in said storage unit; and at least two pairs of spacers on said opposite edges of said shelf member for engaging with said channels.

7. The storage unit of claim 1, wherein a plurality of storage units can be interlocked, further comprising:

complementary arrays of cavities in said outer walls of said panel members, each of said cavities being cylindrical in shape and having a removable plastic membrane;

a plurality of dowels having shapes complementary to said cavities and approximately twice their length, said dowels having a concentric bore so that they can be positioned between said cavities in adjacently positioned storage units; and a plurality of fasteners that can be passed through said dowels to interlock said adjacent storage units.

8. The storage unit of claim 1, further comprising a drawer member which includes:

a three partition side wall having an inside face and an outside face formed by two side panels each having one end connected to a middle back panel by a bendable plastic strip, both of said side panels being bent at substantially right angles relative to said back side at said bendable plastic strips to form a U-shaped side wall of said drawer member;

a first lower horizontal groove running the entire length of the inside of said three partition side wall;

a rectangular-shaped face plate having front and back faces, top and bottom edges and two side edges;

a pair of vertical oval-shaped depressions in said back face which are positioned adjacent to respective side edges of said face plate, the other ends of said side walls being positioned in respective vertical oval depressions of said back face;

a first pair of spaced apart cutaways in one of said side edges and terminating at one of said oval depressions;

a second pair of identical spaced apart cutaways in said other side edge and terminating at said other oval depression;

a second lower horizontal groove running the length of said back face of said face plate, said first and second lower horizontal grooves forming a rectangular groove;

a bottom panel positioned in said rectangular groove;

fasteners inserted through respective cutaways for fastening said ends of said side walls to said face plate; and a pair of horizontal runners on said outside face of each said side wall for engaging with an opposed pair of said channels in said storage unit.

9. The storage unit of claim 8, wherein said drawer member further comprises:

a rectangular-shaped cutaway portion in said top edge of said face plate for securing a snap-in handle;

a pair of bosses on opposed edges of said cutaway portion;

a pair of concave grooves on a bottom edge of said cutaway portion at said front and back faces of said face plate;

a rectangular-shaped snap-in handle having the same overall dimensions as said rectangular cutaway portion for securing in said cutaway portion;

said handle having in cross section an inverted J-shaped portion positioned on top of an inverted U-shape portion; and said inverted J-shaped portion forming a handle, and said inverted U-shaped portion having a pair of opposed horizontal convex runners at its bottom for locking with said concave grooves on both sides of said face plate.

10. An interlocking panel comprising:

a rectangular-shaped member having beveled top and bottom edges, front and rear edges and inner and outer walls;

a top retaining groove in said outer wall that is parallel to and spaced apart from said top edge;

a bottom retaining groove in said outer wall that is parallel to and spaced apart from said bottom edge;

a tab on one of said beveled edges;

a notch complementary to said tab on the other one of said beveled edges; and a channel in said inner wall that is parallel to said top and bottom edges for slidably engaging a drawer or shelf.

11. The interlocking panel of claim 10 further comprising:

a first tab-and-notch pair placed side-by-side on one of said beveled surfaces and adjacent said front edge; and a second tab-and-notch pair complementary to said first pair placed side-by-side on said other beveled surface and adjacent said front edge.

\* \* \* \* \*